United States Patent
Mizuno et al.

[11] Patent Number: 5,818,686
[45] Date of Patent: Oct. 6, 1998

[54] DIELECTRIC CERAMIC COMPOSITION AND MONOLITHIC CERAMIC CAPACITOR USING THE SAME

[75] Inventors: Shinobu Mizuno, Muko; Hidehiko Tanaka, Shiga-ken, both of Japan

[73] Assignee: Murata Manufacturing Co., Ltd., Kyoto, Japan

[21] Appl. No.: 906,036

[22] Filed: Aug. 5, 1997

[30] Foreign Application Priority Data

Aug. 5, 1996 [JP] Japan ................................ 8-206083
Aug. 5, 1996 [JP] Japan ................................ 8-206084

[51] Int. Cl.⁶ .................. H01G 4/06; H01G 4/228; H01G 4/008
[52] U.S. Cl. .................. 361/311; 361/321.4; 361/321.5; 361/303; 361/305; 501/136; 501/137
[58] Field of Search .................. 361/303, 305, 361/306.1, 306.3, 311, 312, 313, 321.4, 321.2, 321.5, 322, 320; 501/135–139; 29/25.42

[56] References Cited

U.S. PATENT DOCUMENTS

| | | | |
|---|---|---|---|
| 5,117,326 | 5/1992 | Sano et al. | 361/321.4 |
| 5,659,456 | 8/1997 | Sano et al. | 361/321.4 |
| 5,731,950 | 3/1998 | Sakamoto et al. | 361/321.4 |
| 5,734,545 | 3/1998 | Sano et al. | 361/321.4 |

*Primary Examiner*—Kristine L. Kincaid
*Assistant Examiner*—Anthony Dinkins
*Attorney, Agent, or Firm*—Ostrolenk, Faber, Gerb & Soffen, LLP

[57] ABSTRACT

A dielectric ceramic composition having (1) 100 parts by weight of a main component represented by compositional formula:

$$\{BaO\}_m \cdot TiO_2 + \alpha Re_2O_3 + \beta MnO$$

wherein $Re_2O_3$ is at least one of $Eu_2O_3$, $Gd_2O_3$, $Tb_2O_3$, $Dy_2O_3$, $Ho_2O_3$, $Er_2O_3$, $Tm_2O_3$, and $Yb_2O_3$; $0.0005 \leq \alpha \leq 0.027$; $0.001 \leq \beta \leq 0.054$; $\beta/\alpha \leq 5$; and $1.000 < m \leq 1.035$, and (2) about 0.2 to 3.0 parts by weight of an $SiO_2$—$TiO_2$—$M^1$-based oxide component (wherein $M^1$ is at least one of BaO, CaO, SrO, MgO, ZnO, and MnO) or an $Li_2O$—$(Si,Ti)O_2$—$M^2$-based oxide component (wherein $M^2$ is at least one of $Al_2O_3$ and $ZrO_2$) and a monolithic ceramic capacitor using the composition are disclosed. The monolithic ceramic capacitor has a dielectric constant of 3000 or higher and a CR product of 6000 M$\Omega \cdot \mu$F or more at room temperature or 2000 M$\Omega \cdot \mu$F or more at 125° C., excellent weathering performance in loading in high temperature or high humidity, and excellent dielectric strength and satisfies the B characteristics specified by JIS and the X7R characteristics specified by EIA.

20 Claims, 4 Drawing Sheets

DIELECTRIC CERAMIC COMPOSITION AND MONOLITHIC CERAMIC CAPACITOR USING THE SAME

FIELD OF THE INVENTION

This invention relates to a dielectric ceramic composition and a monolithic ceramic capacitor using the same, more particularly a middle- to high-voltage monolithic ceramic capacitor having internal electrodes made of nickel or a nickel alloy.

BACKGROUND OF THE INVENTION

A monolithic ceramic capacitor is generally produced according to the following procedures. Dielectric ceramic layers in sheet form having applied thereon an electrode material to serve as an internal electrode are prepared. A ceramic material mainly comprising, e.g., $BaTiO_3$ is used as a dielectric ceramic layer. A prescribed number of the dielectric ceramic layers with the electrode material applied thereon are piled up and press-bonded under heat into one body. The resulting laminate is calcined at 1250° to 1350° C. to obtain a ceramic laminate having internal electrodes. An external electrode is provided on both sides of the ceramic laminate by baking to make an electrical connection to the internal electrodes and to obtain a monolithic ceramic capacitor.

The material for the internal electrodes are required to satisfy the following conditions:

1. To have a melting point at or above the calcining temperature of the ceramic laminate because the internal electrodes and the ceramic laminate are calcined simultaneously.

2. Not to be susceptible to oxidation in a high-temperature oxidative atmosphere and be unreactive with the dielectric ceramic layer.

Noble metals, such as platinum, gold, palladium and a silver-palladium alloy, have been used as an electrode material satisfying these requirements. While excellent in performance, these electrode materials are so expensive that the proportion of the electrode material cost reaches 30 to 70% of the total material cost, which has been the greatest factor of increasing the production cost of monolithic ceramic capacitors.

In addition to noble metals, base metals, such as Ni, Fe, Co, W, and Mo, also have a high melting point. However, these base metals are readily oxidized in a high-temperature oxidative atmosphere, and fail to perform the function as an electrode. Therefore, calcination of the base metal together with dielectric ceramic layers must be carried out in a neutral or reducing atmosphere before it can be used as an internal electrode of a monolithic ceramic capacitor. However, the problem is that the conventional dielectric ceramic materials undergoes vigorous reduction into a semiconductor if calcined in a neutral or reducing atmosphere.

Dielectric ceramic materials which have been proposed in order to solve the above problem include a dielectric ceramic composition comprising a barium titanate solid solution having a barium site to titanium site ratio in excess of a stoichiometric one (see JP-B57-42588, the term "JP-B" as used herein means an "examined published Japanese patent application") and a dielectric ceramic composition comprising a barium titanate solid solution having incorporated therein an oxide of a rare earth element, such as La, Nd, Sm, Dy or Y (see JP-A-61-101459, the term "JP-A" as used herein means an "unexamined published Japanese patent application").

On the other hand, dielectric ceramic compositions whose dielectric constant has reduced temperature dependence, such as a $BaTiO_3$—$CaZrO_3$—$MnO$—$MgO$ system (see JP-A-62-256422) and a $BaTiO_3$—(Mg, Zn, Sr or Ca)O—$B_2O_3$—$SiO_2$ system (see JP-B-61-14611), have also been proposed.

Use of these dielectric ceramic compositions have made it possible to obtain a ceramic laminate that is not transformed into a semiconductor even when calcined in a reducing atmosphere, thereby making it feasible to produce a monolithic ceramic capacitor in which a base metal, such as nickel, is used as an internal electrode.

In recent years, size reduction of electronic components has been accelerated rapidly. Monolithic ceramic capacitors have also shown a remarkable tendency to reduction in size and increase in capacity. There has thus been an increasing demand for a dielectric ceramic composition which has a high dielectric constant with reduced variation with temperature change, shows a high dielectric breakdown voltage, and is thereby highly reliable.

The dielectric ceramic compositions disclosed in JP-B-57-42588 and JP-A-61-101459 exhibit a high dielectric constant but have a large crystal grain size on calcination. When they are applied to a monolithic ceramic capacitor in which each dielectric ceramic layer has such a small thickness as 10 $\mu$m or less, the number of crystal grains existing per layer is decreased, resulting in diminished reliability. Besides, these materials show considerable variation of dielectric constant with temperature change and are not regarded as meeting the market demand sufficiently.

The dielectric ceramic composition disclosed in JP-A-62-256422, on the other hand, exhibits a relatively high dielectric constant and provides, on calcination, a ceramic laminate having a small crystal grain size and showing small variation of dielectric constant with temperature change. However, $CaZrO_3$ and $CaTiO_3$ produced on calcination tend to form a secondary phase together with Mn, etc., which has made the resulting monolithic ceramic capacitor less reliable at high temperatures.

The dielectric ceramic composition disclosed in JP-B-61-14611 exhibits a dielectric constant of 2000 to 2800, which is disadvantageously low for achieving size reduction and capacity increase of a monolithic ceramic capacitor. Moreover, the composition fails to fulfill the requirement of X7R characteristics specified by EIA (Electronic Industries Association) Standards that the percentage of change in electrostatic capacitance be within a range of ±15% in a temperature range of from −55° C. to +125° C.

Further, the dielectric ceramic compositions that are not susceptible to reduction proposed so far have undergone various improvements in resistance against deterioration of insulation resistance in a high-temperature loading test, but there has been no marked improvement on resistance against deterioration of insulation resistance in a high-humidity loading test.

In addition, a monolithic ceramic capacitor used as a middle- to high-tension condenser is required to have a high insulation breakdown voltage as well. The market demand for dielectric strength has been getting intenser on account of the ever-continuing demand for capacity increase and the tendency to reduction in thickness of the dielectric ceramic layers, and therefore the demand for a dielectric ceramic composition having high dielectric strength to cope with the thickness reduction has been increasing. Accordingly, there has been a necessity for development of a small-sized and high-capacity monolithic ceramic capacitor having excellent dielectric strength.

SUMMARY OF THE INVENTION

An object of the present invention is to provide an economical, small-sized and high-capacity monolithic ceramic capacitor which has a dielectric constant of 3000 or higher and an insulation resistance as high as 6000 MΩ·μF or more at room temperature or 2000 MΩ·μF or more at 125° C., as expressed in terms of the product of capacitance and insulation resistance (hereinafter referred to as the CR product), excellent weathering performance in, for example, loading at high temperature or high humidity, and excellent dielectric strength, and whose capacity exhibits temperature characteristics satisfying the B characteristics specified by JIS (Japanese Industrial Standards) and the X7R characteristics specified by EIA.

Another object of the present invention is to provide a dielectric ceramic composition providing a monolithic ceramic capacitor having the above-described excellent characteristics.

The present invention provides a dielectric ceramic composition containing (a) barium titanate, (b) at least one member selected from the group consisting of europium oxide, gadolinium oxide, terbium oxide, dysprosium oxide, holmium oxide, erbium oxide, thulium oxide and ytterbium oxide and is made up of a material comprising (1) 100 parts by weight of a main component represented by compositional formula:

wherein $Re_2O_3$ represents at least one member selected from the group consisting of $Eu_2O_3$, $Gd_2O_3$, $Tb_2O_3$, $Dy_2O_3$, $Ho_2O_3$, $Er_2O_3$, $Tm_2O_3$ and $Yb_2O_3$; $0.0005 \leq \alpha \leq 0.027$; $0.001 \leq \beta \leq 0.054$; $\beta/\alpha \leq 5$; and $1.000 < m \leq 1.035$, and, as a secondary component, (2) about 0.2 to 3.0 parts by weight of an $SiO_2$—$TiO_2$—$M^1$-based oxide (wherein $M^1$ represents at least one member selected from the group consisting of BaO, CaO, SrO, MgO, ZnO and MnO) (hereinafter referred to as the first invention) or an $Li_2O$—$(Si,Ti)O_2$—$M^2$-based oxide (wherein $M^2$ represents at least one of $Al_2O_3$ and $ZrO_2$) (hereinafter referred to as the second invention).

The present invention also provides a monolithic ceramic capacitor having a laminate of dielectric ceramic layers, at least two internal electrodes formed between two dielectric ceramic layers in such a manner that one end of each internal electrode is exposed at one end of the dielectric ceramic layer alternately, and a pair of external electrodes electrically connected to the exposed internal electrode on each side of the laminate, in which the dielectric ceramic layer comprises the dielectric ceramic composition of the first invention or the dielectric ceramic composition of the second invention.

Figure 4:
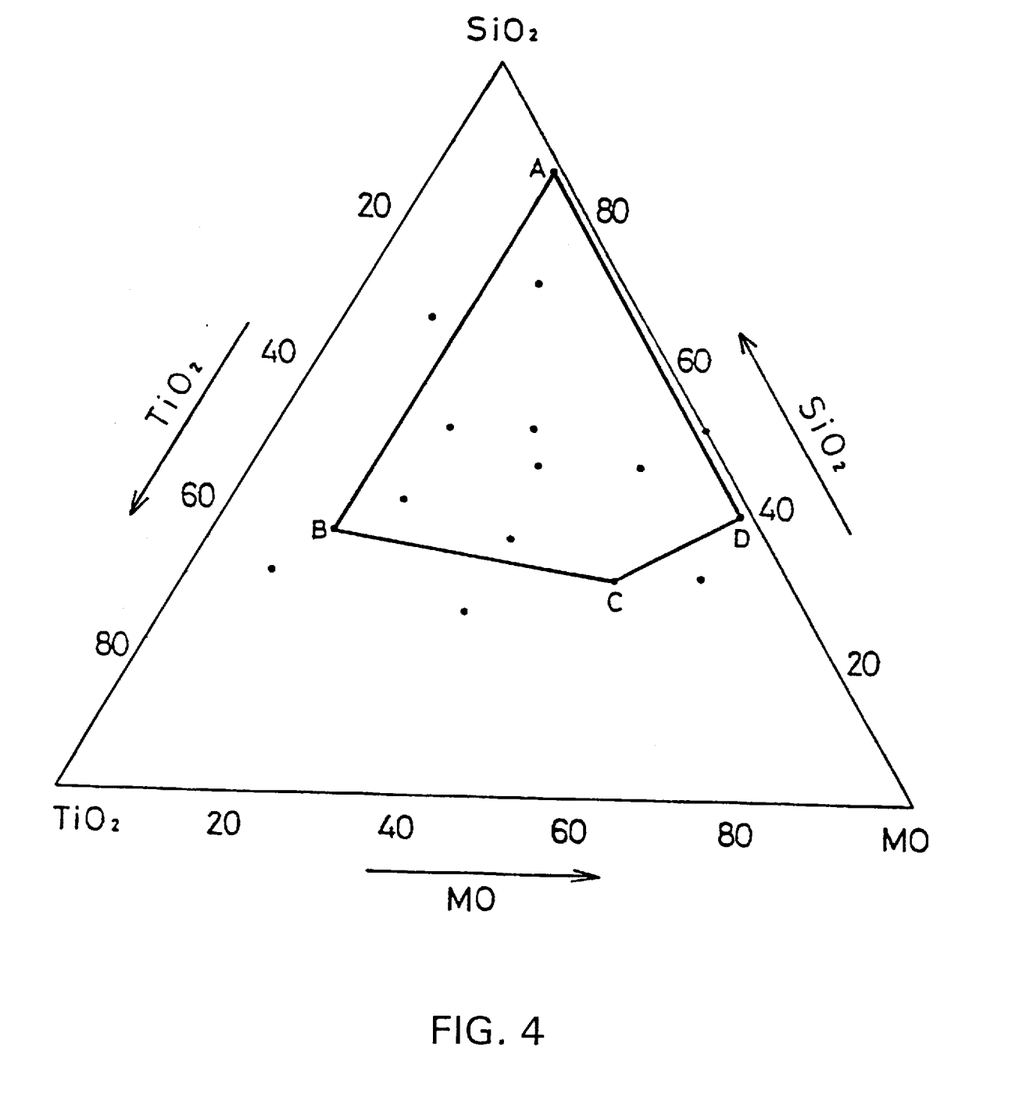
FIG. 4 is a triangular diagram of $(SiO_2, TiO_2, M^1)$ showing a preferred range of the composition of $SiO_2$—$TiO_2$—$M^1$-based oxide.

In a preferred embodiment of the dielectric ceramic composition of the first invention and the monolithic ceramic capacitor using the same, the composition of the $SiO_2$—$TiO_2$—$M^1$-based oxide is, when plotted on a triangular diagram of $(SiO_2, TiO_2, M^1)$, in the area surrounded by, or on, four straight lines connecting four points: A (85,1,14), B (35,51,14), C (30,20,50), and D (39,1,60) (unit: mol %), and contains at least one of $Al_2O_3$ and $ZrO_2$ in a total amount of not more than about 15 parts by weight per 100 parts by weight of the $(SiO_2, TiO_2, M^1)$ component, provided that the amount of $ZrO_2$ is not more than about 5 parts by weight.

Figure 5:
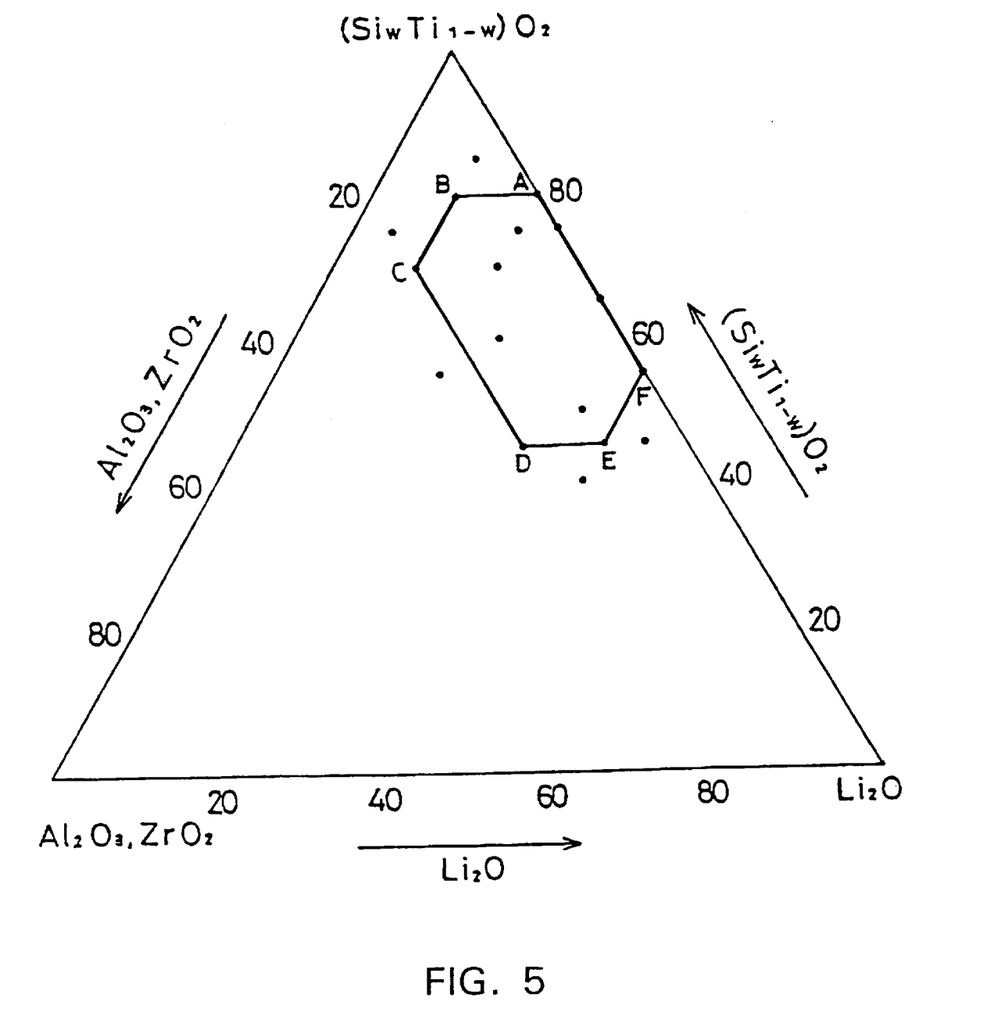
FIG. 5 is a triangular diagram of $\{Li_2O, (Si_wTi_{1-w})O_2, M^2\}$ showing a preferred range of the composition of $Li_2O$—$(Si,Ti)O_2$—$M^2$-based oxide.

In a preferred embodiment of the dielectric ceramic composition of the second invention and the monolithic ceramic capacitor using the same, the composition of the $Li_2O$—$(Si,Ti)O_2$—$M^2$-based oxide is, when plotted on a triangular diagram of $\{Li_2O, (Si_wTi_{1-w})O_2, M^2\}$ (wherein $0.30 \leq w \leq 1.0$), in the area surrounded by, or on, six straight lines connecting six points: A (20, 80, 0), B (10, 80, 10), C (10, 70, 20), D (25, 45, 20), E (45, 45, 10), and F (45, 55, 0) (unit: mol %), provided that $0.30 \leq w < 1.0$ when the composition is on the line A–F.

In another preferred embodiment of the present invention, the external electrode is made up of a sintered layer of an electrically conductive metal powder which may contain glass frit. In a still preferred embodiment of the present invention, the external electrode is composed of a first layer made of a sintered layer of an electrically conductive metal powder which may contain glass frit and a second layer that is formed on the first layer by plating.

The present invention is particularly effective when applied to a monolithic ceramic capacitor using nickel or a nickel alloy as an internal electrode.

DETAILED DESCRIPTION OF THE INVENTION

The dielectric ceramic composition according to the present invention which comprises the main component having the above-described compositional formula and a specific oxide component as a secondary component can be calcined in a reducing atmosphere without suffering from deterioration of characteristics to provide a dielectric ceramic layer. Therefore, the monolithic ceramic capacitor prepared by using the dielectric ceramic composition is highly reliable, satisfying the B characteristics specified by JIS and the X7R characteristics specified EIA, both of which are the capacity-temperature characteristics, and exhibiting high insulation resistance at room temperature and high temperature and excellent dielectric strength.

In the dielectric ceramic composition of the present invention, the rare earth element oxides $(Re_2O_3)$ have improved dispersibility and do not undergo agglomeration. As a result, even if the dielectric ceramic layer has a small thickness, reduction in dielectric strength can be avoided.

The barium titanate constituting the main component contains, as impurities, alkaline earth metal oxides (e.g., Sro and CaO), alkali metal oxides (e.g., $Na_2O$ and $K_2O$), and other oxides (e.g., $Al_2O_3$ and $SiO_2$). Of these impurities, the alkali metal oxides, such as $Na_2O$ and $K_2O$, have been confirmed to be greatly influential on the electrical characteristics. It was proved that a dielectric constant of 3000 or higher can be obtained by using barium titanate having an alkali metal oxide content of not more than about 0.02% by weight.

It has also been found that the presence of an oxide component $SiO_2$—$TiO_2$—$M^1$ (wherein $M^1$ is at least one member selected from the group consisting of BaO, CaO, SrO, MgO, ZnO and MnO) in the dielectric ceramic composition brings about improved sintering properties and improved resistance to loading under a high humidity condition. Further, addition of $Al_2O_3$ and/or $ZrO_2$ to the $SiO_2$—$TiO_2$—$M^1$-based oxide makes it possible to obtain higher insulation resistance (first invention).

It has further been found that the presence of an oxide component $Li_2O$—$(Si,Ti)O_2$—$M^2$ in the dielectric ceramic composition brings about improved sintering properties and improved dielectric strength (second invention).

Use of the dielectric ceramic composition according to the first and second inventions makes it feasible to use nickel or a nickel alloy as an internal electrode.

The external electrode is not particularly limited in composition. For example, it can be a sintered layer of a conductive powder of various metals (e.g., Ag, Pd, Ag—Pd, Cu, and Cu alloys) or a sintered layer of a mixture of such a conductive metal powder and glass frits of various kinds (e.g., $B_2O_3$—$Li_2O$—$SiO_2$—BaO-based glass frits, $B_2O_3$—$SiO_2$—BaO-based glass frits, $Li_2O$—$SiO_2$—BaO-based glass frits, $B_2O_3$—$SiO_2$—ZnO-based glass frits). It is preferable that the sintered layer is plated with Ni, Cu, an Ni—Cu alloy, etc. The plated layer may further be plated with solder, tin, etc.

Preferred embodiments of the present invention will be described by referring to the accompanying drawings.

Figure 1:
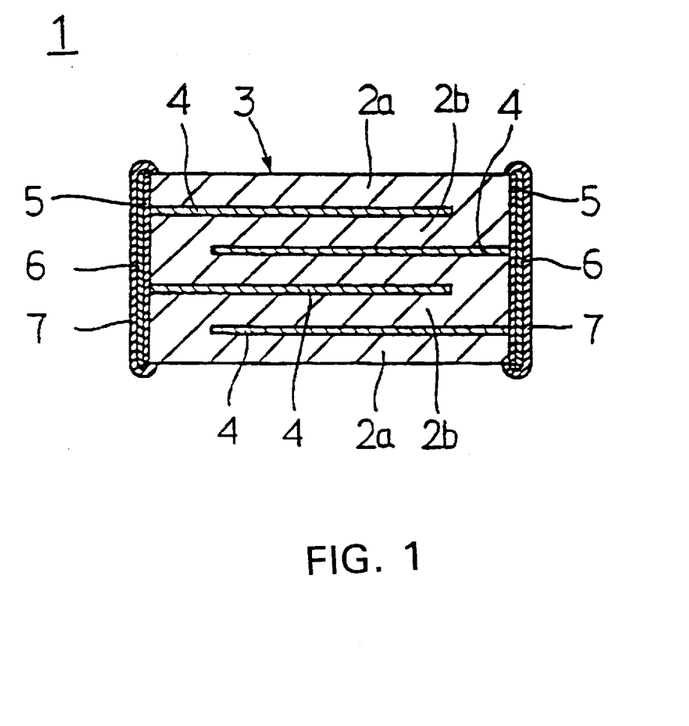
FIG. 1 is a schematic cross section of a monolithic ceramic capacitor according to one embodiment of the present invention.
Figure 2:
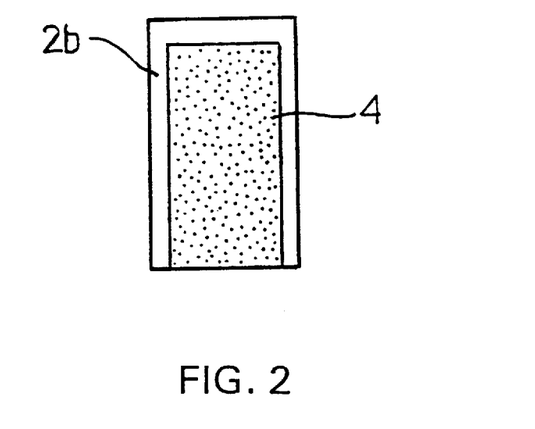
FIG. 2 is a schematic plan of a ceramic layer with an internal electrode which is used in the monolithic ceramic capacitor of FIG. 1.
Figure 3:
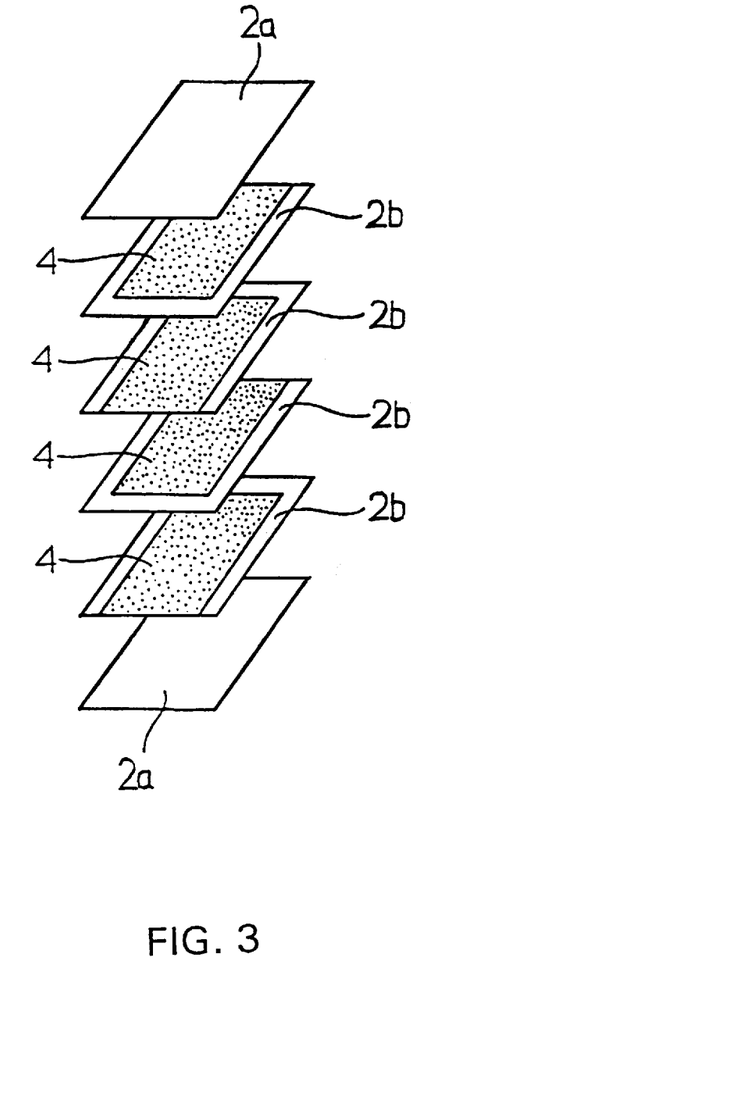
FIG. 3 is a perspective exploded view of the ceramic laminate used in the monolithic ceramic capacitor of FIG. 1.

FIG. 1 is a schematic cross section of the monolithic ceramic capacitor. FIG. 2 is a schematic plan of a ceramic layer having an internal electrode used in the monolithic ceramic capacitor of this embodiment. FIG. 3 is a perspective exploded view of the ceramic laminate used in the monolithic ceramic capacitor of this embodiment.

As shown in FIG. 1, the monolithic ceramic capacitor 1 is of rectangular chip type having a ceramic laminate 3 composed of a plurality of dielectric ceramic layers 2a and 2b, with an internal electrode 4 being interposed between every two ceramic layers. On each side of the ceramic laminate 3 are formed an external electrode 5, a first plating layer 6 formed by plating with nickel, copper, etc., and a second plating layer 7 formed by plating with solder, tin, etc.

The monolithic ceramic capacitor 1 shown in FIG. 1 can be produced as follows.

A powder mixture comprising (a) barium titanate, (b) at least one rare earth element oxide selected from the group consisting of europium oxide, gadolinium oxide, terbium oxide, dysprosium oxide, holmium oxide, erbium oxide, thulium oxide and ytterbium oxide, (c) manganese oxide, and (e) an oxide component mainly comprising $SiO_2$—$TiO_2$—$M^1$ or an oxide component mainly comprising $Li_2O$—$(Si,Ti)O_2$—$M^2$ is compounded into a slurry and molded to prepare a dielectric ceramic layer (green sheet). An internal electrode 4 is formed of nickel or a nickel alloy on one side of the dielectric ceramic layer 2b by screen printing, vacuum evaporation or plating to obtain a dielectric ceramic layer 2b having an internal electrode 4 as shown in FIG. 2.

A prescribed number of the dielectric ceramic layers 2b are piled up and press-bonded inbetween a pair of dielectric ceramic layers 2a having no internal electrode to obtain a laminate as shown in FIG. 3. The laminate of the dielectric ceramic layers 2a, 2b . . . 2b, 2a is calcined in a reducing atmosphere at a prescribed temperature to form a ceramic laminate 3.

An external electrode 5 is then formed on each side of the ceramic laminate 3 to make an electrical connection to the internal electrodes 4. The external electrodes 5 can be made of the same material as used for the internal electrodes 4. In addition, silver, palladium, a silver-palladium alloy, copper, a copper alloy, etc. are also useful. These metal powders may be used in combination with glass frits, such as $B_2O_3$—$SiO_2$—BaO-based glass frits or $Li_2O$—$SiO_2$—BaO-based glass frits. The material of the external electrode should be selected appropriately taking into consideration the use of the resulting monolithic ceramic capacitor, the place of use, and the like. The external electrodes 5 can be formed by applying a paste of the metal powder selected to the ceramic laminate 3 (i.e., a calcined laminate) followed by baking. Alternatively, the paste may be applied to the laminate of the green sheets before calcination and baked to form the electrodes 5 and the ceramic laminate 3 simultaneously.

The external electrodes 5 are then plated with nickel, copper, etc. to form a first layer 6. Finally, the first layer 6 is plated with solder, tin, etc. to form a second layer 7, thereby to produce a monolithic ceramic capacitor 1 of chip type.

As described above, the ceramic composition according to the present invention does not undergo reduction and therefore does not change into a semiconductor even if calcined in a reducing atmosphere, which allows use of a base metal (nickel or a nickel alloy) as an electrode material. Further, calcination of the ceramic composition can be achieved at a relatively low temperature of not higher than 1300° C. As a result, both the material cost and the process cost of monolithic ceramic capacitors can be reduced.

The monolithic ceramic capacitor according to the present invention exhibits excellent characteristics, having a dielectric constant of 3000 or more, having a high insulation resistance, and undergoing no deterioration in characteristics under a high temperature or high humidity condition.

Since the rare earth element oxides in the ceramic composition have improved dispersibility, producing no agglomerates in the dielectric ceramic layers. Therefore, if the thickness of dielectric ceramic layers constituting a monolithic ceramic capacitor is reduced, each layer exhibits high dielectric strength. There is thus provided a small-sized and yet high-capacity monolithic ceramic capacitor.

The present invention will now be illustrated in greater detail with reference to Examples, but it should be understood that the present invention is not construed as being limited thereto.

EXAMPLE 1

$TiCl_4$ and $Ba(NO_3)_2$ both having a varied purity were weighed and treated with oxalic acid to precipitate barium titanyl oxalate ($BaTiO(C_2O_4)\cdot 4H_2O$). The precipitate was thermally decomposed at or above 1000° C. to synthesize 4 species of barium titanate ($BaTiO_3$) shown in Table 1 below.

TABLE 1

| Kind of $BaTiO_3$ | Content of Impurities (wt %) | | | | | Average particle Size ($\mu$m) |
| --- | --- | --- | --- | --- | --- | --- |
| | Alkali Metal Oxide | SrO | CaO | $SiO_2$ | $Al_2O_3$ | |
| A | 0.003 | 0.012 | 0.001 | 0.010 | 0.005 | 0.60 |
| B | 0.020 | 0.010 | 0.003 | 0.019 | 0.008 | 0.56 |
| C | 0.012 | 0.179 | 0.018 | 0.155 | 0.071 | 0.72 |
| D | 0.062 | 0.014 | 0.001 | 0.019 | 0.004 | 0.58 |

Oxides, carbonates or hydroxides of silicon, titanium, barium, and manganese were weighted and mixed so as to give an $SiO_2:TiO_2:BaO:MnO$ molar ratio of 0.66:0.17:0.15:0.02. The mixture was ground and heated to 1500° C. in a platinum crucible, quenched, and ground to obtain a powdered oxide mixture having an average particle size of not greater than 1 $\mu$m.

The ceramic compositions shown in Table 2 below were compounded from (i) the barium titanate of Table 1, (ii) the powdered oxide mixture prepared above, (iii) $BaCO_3$ serving for adjustment of the Ba/Ti molar ratio of barium titanate, and (iv) at least one of $Eu_2O_3$, $Gd_2O_3$, $Tb_2O_3$, $Dy_2O_3$, $Ho_2O_3$, $Er_2O_3$, $Tm_2O_3$ and $Yb_2O_3$, and MnO, each having a purity of not lower than 99%.

form an external electrode electrically connected to the internal electrodes.

The thus prepared monolithic ceramic capacitor had a width of 5.0 mm, a length of 5.7 mm, and a thickness of 2.4 mm. Each dielectric ceramic layer between two internal electrode layers had a thickness of 58 $\mu$m. The number of effective dielectric ceramic layers was 32. The area of the opposing electrodes was $16.3 \times 10^{-6}$ mm$^2$ per side.

The electric characteristics of the capacitor were measured as follows. The capacitance (C) and the dielectric loss (tan $\delta$) were measured with an automatic bridge type meter at 1 kHz, 1 Vrms and 25° C. From the capacitance was

TABLE 2

| | | Main Component $\{BaO\}_m \cdot TiO_2 + \alpha Re_2O_3 + \beta MnO$ | | | | | | | | | | | | Secondary Component $SiO_2$—$TiO_2$—$M^1$- |
|---|---|---|---|---|---|---|---|---|---|---|---|---|---|---|
| Sample | Kind of | | | | $\alpha$ | | | | | | | | | based Oxide |
| No. | $BaTiO_3$ | $Eu_2O_3$ | $Gd_2O_3$ | $Tb_2O_3$ | $Dy_2O_3$ | $Ho_2O_3$ | $Er_2O_3$ | $Tm_2O_3$ | $Yb_2O_3$ | Total | $\beta$ | $\beta/\alpha$ | m | (part**) |
| 101* | A | — | — | — | — | — | — | — | — | 0.0000 | 0.0100 | | 1.030 | 0.80 |
| 102* | A | — | — | 0.0100 | — | — | 0.0040 | — | — | 0.0140 | 0.0000 | 0 | 1.010 | 0.80 |
| 103* | A | — | — | — | 0.0100 | — | — | — | 0.0040 | 0.0140 | 0.0100 | 5/7 | 0.990 | 0.80 |
| 104* | A | — | 0.0100 | — | — | — | — | 0.0040 | — | 0.0140 | 0.0100 | 5/7 | 1.000 | 0.80 |
| 105* | A | 0.0100 | — | — | — | 0.0040 | — | — | — | 0.0140 | 0.0100 | 5/7 | 1.022 | 0.00 |
| 106 | A | — | 0.0005 | — | — | — | — | — | — | 0.0005 | 0.0020 | 4 | 1.005 | 0.50 |
| 107 | A | 0.0100 | — | — | — | 0.0100 | — | — | — | 0.0200 | 0.0200 | 1 | 1.010 | 0.20 |
| 108 | A | — | — | 0.0010 | 0.0030 | — | — | — | — | 0.0040 | 0.0040 | 1 | 1.035 | 0.80 |
| 109 | A | — | 0.0020 | — | — | — | 0.0020 | — | — | 0.0040 | 0.0080 | 2 | 1.010 | 0.80 |
| 110 | A | — | — | — | 0.0010 | — | — | 0.0010 | 0.0020 | 0.0040 | 0.0080 | 2 | 1.030 | 0.80 |
| 111 | A | 0.0070 | — | — | 0.0200 | — | — | — | — | 0.0270 | 0.0540 | 2 | 1.025 | 1.50 |
| 112 | C | — | 0.0050 | — | — | — | — | 0.0050 | — | 0.0100 | 0.0050 | ½ | 1.005 | 1.50 |
| 113 | B | — | — | — | — | 0.0050 | 0.0050 | — | — | 0.0100 | 0.0100 | 1 | 1.010 | 3.00 |
| 114 | A | — | — | 0.0010 | — | — | — | — | 0.0010 | 0.0020 | 0.0100 | 5 | 1.010 | 2.50 |
| 115 | A | — | 0.0030 | — | 0.0050 | — | — | — | — | 0.0080 | 0.0040 | ½ | 1.015 | 2.50 |
| 116 | A | 0.0005 | 0.0005 | — | — | — | — | — | — | 0.0010 | 0.0010 | 1 | 1.015 | 1.50 |
| 117 | A | — | — | — | 0.0200 | 0.0030 | — | — | — | 0.0230 | 0.0230 | 1 | 1.010 | 0.80 |
| 118* | A | — | 0.0100 | 0.0200 | — | — | — | — | — | 0.0300 | 0.0300 | 1 | 1.010 | 0.80 |
| 119* | A | — | — | — | 0.0100 | — | 0.0100 | — | — | 0.0200 | 0.0800 | 4 | 1.010 | 0.80 |
| 120* | A | — | — | 0.0007 | — | — | — | — | — | 0.0007 | 0.0077 | 11 | 1.020 | 0.80 |
| 121* | A | 0.0030 | — | — | — | — | — | 0.0050 | — | 0.0080 | 0.0160 | 2 | 1.050 | 0.80 |
| 122* | A | — | 0.0050 | — | — | 0.0050 | — | — | — | 0.0100 | 0.0200 | 2 | 1.020 | 5.00 |
| 123* | D | — | — | — | 0.0010 | — | — | — | — | 0.0010 | 0.0020 | 2 | 1.020 | 1.50 |

Note:
*Samples with an asterisk are those out of the scope of the invention.
**Per 100 parts by weight of the main component.

The resulting ceramic composition was kneaded in a ball mill in a wet process together with a polyvinyl butyral type binder and an organic solvent, such as ethanol, to prepare a ceramic slurry. The slurry was shaped into a 11 $\mu$m thick rectangular green of at by means of a doctor blade. A conductive paste mainly comprising nickel was screen printed on the ceramic green sheet to form a conductive paste layer one end of which reached one of the ends of the green sheet.

A plurality of the ceramic green sheets were piled up in such a manner that the every other ceramic green sheet had its end with the internal electrode exposed arranged on the same side of the resulting laminate. The laminate was heated at 350° C. in a nitrogen atmosphere to burn the binder and then calcined at a temperature shown in Table 3 below for 2 hours in a reducing atmosphere of $H_2$—$N_2$—$H_2O$ gas having an oxygen partial pressure of $10^{-9}$ to $10^{-12}$ MPa to obtain a ceramic laminate.

A silver paste containing $B_2O_3$—$Li_2O$—$SiO_2$—BaO-based glass frit was applied onto each side of the ceramic laminate where a group of the internal electrodes were exposed and baked at 600° C. in a nitrogen atmosphere to calculated the dielectric constant ($\in$). The insulation resistance (R) was measured with an insulation resistance tester by applying a direct voltage of 630 V for 2 minutes at 25° C. and 125° C. and the product of the capacitance (C) and the insulation resistance (R), i.e., CR product, was obtained.

Further, capacitance was measured at varying temperatures to determine the percentage of difference between capacitances measured at −25° C. or 85° C. to the capacitance at 20° C. (percentage change: $\Delta C/C_{20}$), a percentage of a difference between capacitances measured at −55° C. or 125° C. to the capacitance at 25° C. (percentage change: $\Delta C/C_{25}$), and the maximum absolute percentage change in capacitance measured in a temperature range of from −55° to 125° C. ($|\Delta C|_{max}$).

The duration of the capacitor was evaluated by a high-temperature loading test. A direct voltage of 1000 V was applied to each of 36 condensers per sample at 150° C., and the insulation resistance (R) was measured over time. The time when the insulation resistance fell to $10^6 \Omega$ or lower was taken as a duration of life, and an average duration of life was obtained for each sample.

Furthermore, an AC voltage or a DC voltage was applied to each condenser at a rate of voltage increase of 100 V/sec, and the dielectric breakdown voltage under the AC or DC voltage was measured.

The results of the above measurements are shown in Table 3 below.

the dielectric ceramic is reduced upon calcination in a reducing atmosphere and changes into a semiconductor having a reduced insulation resistance.

TABLE 3

| Sample No. | Calcining Temp (°C.) | Dielectric Constant ε | Dielectric Loss (tan δ) (%) | Percentage Change in Capacitance with Temp. (%) | | | | | CR Product (Ω · F) | | Dielectric Breakdown Voltage (kV/mm) | | Average Duration of Life (hr) |
|---|---|---|---|---|---|---|---|---|---|---|---|---|---|
| | | | | ΔC/C$_{20}$ | | ΔC/C$_{25}$ | | | | | | | |
| | | | | −25° C. | +85° C. | −55° C. | 125° C. | max | 25° C. | 125° C. | AC | DC | |
| 101* | 1300 | 2850 | 1.5 | −1 | −7 | −2.1 | −13 | 13 | 4330 | 1730 | 12 | 14 | 10 |
| 102* | 1280 | | | unmeasurable due to transformation into a semiconductor | | | | | | | | | |
| 103* | 1280 | | | unmeasurable due to transformation into a semiconductor | | | | | | | | | |
| 104* | 1280 | 3120 | 1.2 | −0.8 | −8.5 | −1.7 | −11.4 | 11.4 | 3850 | 820 | 10 | 11 | 122 |
| 105* | 1360 | | | unmeasurable due to undersintering | | | | | | | | | |
| 106 | 1300 | 3350 | 1.2 | −2 | −8 | −2.8 | −10.5 | 10.5 | 6960 | 2100 | 13 | 15 | 943 |
| 107 | 1280 | 3210 | 1.5 | −0.5 | −6.9 | −1.3 | −11.9 | 11.9 | 7010 | 2190 | 13 | 15 | 625 |
| 108 | 1300 | 3230 | 1.7 | −3 | −9.1 | −5.1 | −12.5 | 12.5 | 6090 | 2030 | 13 | 15 | 809 |
| 109 | 1280 | 3130 | 1.6 | −4.9 | −7.2 | −5.7 | −10.9 | 10.9 | 6960 | 2130 | 12 | 14 | 873 |
| 110 | 1280 | 3150 | 1.1 | −2.8 | −6.4 | −4.6 | −11.1 | 11.1 | 6820 | 2090 | 13 | 15 | 930 |
| 111 | 1280 | 3350 | 1.2 | −3.1 | −8.5 | −5.7 | −12.5 | 12.5 | 7100 | 2210 | 13 | 15 | 679 |
| 112 | 1300 | 3090 | 1.5 | −0.6 | −7.3 | −1.4 | −13.6 | 13.6 | 7040 | 2170 | 13 | 15 | 704 |
| 113 | 1260 | 3240 | 1.2 | −4 | −7.4 | −5.6 | −10.2 | 10.2 | 6080 | 2040 | 12 | 14 | 777 |
| 114 | 1280 | 3060 | 1.3 | −0.1 | −7 | −0.8 | −13 | 13 | 6830 | 2090 | 13 | 15 | 915 |
| 115 | 1280 | 3340 | 1.6 | −2.6 | −8.4 | −4 | −10.3 | 10.3 | 6950 | 2120 | 13 | 15 | 763 |
| 116 | 1300 | 3130 | 1.5 | −0.9 | −9.1 | −1.9 | −12.3 | 12.3 | 6840 | 2110 | 13 | 15 | 840 |
| 117 | 1300 | 3080 | 1.5 | −3.8 | −9.2 | −5.2 | −11 | 11 | 6760 | 2100 | 13 | 15 | 761 |
| 118* | 1360 | 2310 | 1.5 | −0.1 | −7.9 | −1.1 | −11.4 | 11.4 | 2990 | 700 | 10 | 11 | 63 |
| 119* | 1280 | 3200 | 1.9 | −1.6 | −8.3 | −3.9 | −12.3 | 12.3 | 4770 | 1050 | 10 | 11 | 121 |
| 120* | 1280 | 3110 | 1.2 | −3.4 | −6.4 | −4.8 | −13 | 13 | 4200 | 950 | 11 | 12 | 105 |
| 121* | 1360 | | | unmeasurable due to undersintering | | | | | | | | | |
| 122* | 1200 | 2110 | 2.3 | −3 | −8.1 | −5.2 | −12.4 | 12.4 | 5210 | 1730 | 8 | 10 | 274 |
| 123* | 1280 | 2700 | 1.5 | −1.7 | −9.2 | −4.2 | −13.9 | 13.9 | 6310 | 2530 | 13 | 15 | 511 |

Note:
Samples with an asterisk are those out of the scope of the invention.

As is apparent from Tables 1 through 3, the monolithic ceramic capacitors according to the first invention have a dielectric constant (∈) of 3000 or higher and a dielectric loss (tan δ) of 1.7% or less, and their percentage change in capacitance with temperature satisfies the B characteristics standard (JIS) between −25° C. and 85° C. and the X7R characteristics standard (EIA) between −55° C. and 125° C. The insulation resistance at 25° C. and 125° C., as expressed in terms of CR product, is as high as 6000 MΩ·μF or more and 2000 MΩ·μF or more, respectively. The dielectric breakdown voltage is 12 to 13 kV/mm under AC and 14 to 15 kV/mm under DC. The average duration of life is as long as 600 hours or longer. The ceramic composition used in these capacitors can be calcined at relatively low temperatures of 1300° C. or lower.

In the main component represented by formula {BaO}$_m$·TiO$_2$+αRe$_2$O$_3$+βMnO (wherein Re$_2$O$_3$ is as defined above), α should range from about 0.0005 to 0.027, preferably about 0.001–0.023. If α representing the amount of Re$_2$O$_3$ is less than about 0.0005 as in sample 101, the dielectric constant ∈ is lower than 3000, the CR products at 25° C. and 125° C. are small, and the average duration of life is short.

If α exceeds about 0.027 as in sample 118, the calcining temperature must be increased, the dielectric constant does not exceed 3000, the CR products are small, the dielectric breakdown voltage is low under both AC and DC, and the average duration of life is short.

In the above formula, β representing the amount of MnO should range from about 0.001 to 0/054, preferably about 0.002–0.02. If β is less than about 0.001 as in sample 102, If β exceeds about 0.054, on the other hand, reductions in CR product at 25° C. and 125° C., dielectric breakdown voltage, and average duration of life result, as is observed with sample 119.

The ratio β/α representing the ratio of manganese oxide to rare earth element oxides should be about 5 or less, preferably about 4 or less. If it exceeds about 5, the CR products at 25° C. and 125° C., the dielectric breakdown voltage, and the average duration of life are reduced as is observed with sample 120.

m representing the molar ratio of barium titanate should be more than about 1.000 and not more than about 1.035, preferably about 1.005–1.03. If it is about 1.000 or less as in samples 103 and 104, the dielectric ceramic composition is transformed into a semiconductor having reduced insulation resistance when calcined in a reducing atmosphere (sample 103) or the dielectric breakdown voltage is low under both AC and DC, the CR products are small, and the average duration of life is short (sample 104). If the molar ratio m exceeds about 1.035, the sintering properties are extremely poor as is observed with sample 121.

The amount of the SiO$_2$—TiO$_2$—M$^1$-based oxide should be in a range of from about 0.2 to 3.0 parts by weight per 100 parts by weight of the main component, preferably about 0.8–2.5. If it is less than about 0.2 part as in sample 105, the ceramic composition suffers from undersintering. If it exceeds about 3.0 parts as in sample 122, the dielectric constant does not exceed 3000, the dielectric loss exceeds 2.0%, the CR product at 25° C. and 125° C. does not exceed 6000 MΩ·μF and 2000 MΩ·μF, respectively, the dielectric breakdown voltage does not exceed 12 kV/mm under AC or 14 kV/mm under DC, and the duration of life is short.

The content of alkali metal oxide impurities in barium titanate should be about 0.02% by weight or less, preferably about 0.012% or less. If it exceeds about 0.02% as in sample 123, reduction in dielectric constant results.

EXAMPLE 2

An $SiO_2$—$TiO_2$—$M^1$-based oxide having the composition shown in Table 4 below and an average particle size of not greater than 1 μm was prepared by heating a raw material mixture at 1200° to 1500° C. The resulting oxide was added to a main component represented by compositional formula (molar ratio):

$$Ba_{1.035}O \cdot TiO_2 + 0.0010Tb_2O_3 + 0.0030Dy_2O_3 + 0.0040MnO$$

in which barium titanate A shown in Table 1 was used to prepare a ceramic composition.

A monolithic ceramic capacitor was produced in the same manner as in Example 1, except for using the above prepared ceramic composition. The shape and size of the monolithic ceramic capacitor were the same as those in Example 1. The electrical characteristics of the resulting condenser were evaluated in the same manner as in Example 1. The results obtained are shown in Table 5 below.

TABLE 4

| Sample No. | Amount of Oxide Added (wt %) | Components of $SiO_2$—$TiO_2$—$M^1$-based Oxide | | | | | | | | | Additive Component (wt %**) | |
|---|---|---|---|---|---|---|---|---|---|---|---|---|
| | | Main Components (mol %) | | | | | | | | | | |
| | | | | MO | | | | | | | | |
| | | $SiO_2$ | $TiO_2$ | BaO | CaO | SrO | MgO | ZnO | MnO | Total | $Al_2O_3$ | $ZrO_2$ |
| 201 | 1.0 | 85 | 1 | 1 | — | — | — | 4 | 9 | 14 | — | — |
| 202 | 1.0 | 35 | 51 | — | 10 | — | — | — | 4 | 14 | — | — |
| 203 | 1.0 | 30 | 20 | — | 30 | — | 15 | 4 | 1 | 50 | — | — |
| 204 | 1.0 | 39 | 1 | 20 | 20 | 2 | — | 13 | 5 | 60 | — | — |
| 205 | 1.0 | 70 | 10 | 5 | 5 | — | — | 10 | — | 20 | — | — |
| 206 | 1.0 | 45 | 10 | — | — | — | — | 15 | 30 | 45 | — | — |
| 207 | 1.0 | 50 | 20 | 10 | 10 | 3 | 7 | — | — | 30 | — | — |
| 208 | 1.0 | 50 | 30 | — | 16 | — | — | — | 4 | 20 | — | — |
| 209 | 1.0 | 35 | 30 | 25 | 10 | — | — | — | — | 35 | — | — |
| 210 | 1.0 | 40 | 40 | 10 | — | — | — | 5 | 5 | 20 | — | — |
| 211 | 1.0 | 45 | 22 | 3 | 30 | — | — | — | — | 33 | 15 | — |
| 212 | 1.0 | 45 | 22 | 3 | 30 | — | — | — | — | 33 | 10 | 5 |
| 213* | 1.0 | 65 | 25 | 5 | 5 | — | — | — | — | 10 | — | — |
| 214* | 1.0 | 25 | 40 | 15 | — | 10 | — | 5 | 5 | 35 | — | — |
| 215* | 1.0 | 30 | 10 | 30 | 25 | — | — | 5 | — | 60 | — | — |
| 216* | 1.0 | 50 | 0 | 35 | 15 | — | — | — | — | 50 | — | — |
| 217* | 1.0 | 45 | 22 | 30 | — | — | — | — | — | 33 | 25 | — |
| 218* | 1.0 | 45 | 22 | 30 | — | — | — | — | — | 33 | — | 15 |
| 219* | 1.0 | 30 | 60 | 10 | — | — | — | — | — | 10 | — | — |

Note:
*Samples with an asterisk are those out of the scope of the invention.
**Based on the total weight of the main components.

TABLE 5

| Sample No. | Calcining Temp (°C.) | Dielectric Constant ε | Dielectric Loss (tan δ) (%) | Percentage Change in Capacitance with Temp. (%) | | | | | CR Product (Ω · F) | | Dielectric Breakdown Voltage (kV/mm) | | Average Duration of Life (hr) |
|---|---|---|---|---|---|---|---|---|---|---|---|---|---|
| | | | | $\Delta C/C_{20}$ | | $\Delta C/C_{25}$ | | | | | | | |
| | | | | −25° C. | +85° C. | −55° C. | 125° C. | max | 25° C. | 125° C. | AC | DC | |
| 201 | 1300 | 3310 | 1.3 | −0.3 | −6.5 | −0.9 | −8.9 | 8.9 | 6710 | 2060 | 12 | 14 | 705 |
| 202 | 1300 | 3060 | 1.4 | −1.5 | −6 | −2.2 | −9 | 9 | 6920 | 2190 | 13 | 15 | 953 |
| 203 | 1300 | 3120 | 1.4 | −1.5 | −7.5 | −2.3 | −10.1 | 10.1 | 6840 | 2130 | 13 | 15 | 881 |
| 204 | 1300 | 3170 | 1.1 | −3.2 | −8.6 | −4.5 | −12.3 | 12.3 | 6850 | 2150 | 13 | 15 | 786 |
| 205 | 1280 | 3150 | 1.3 | −0.9 | −6.9 | −1.6 | −10 | 10 | 6910 | 2190 | 13 | 15 | 732 |
| 206 | 1280 | 3220 | 1.5 | −1.5 | −8.3 | −2.3 | −12.5 | 12.5 | 6740 | 2080 | 12 | 14 | 689 |
| 207 | 1300 | 3090 | 1.4 | −2 | −7.6 | −3.9 | −11.2 | 11.2 | 6830 | 2170 | 13 | 15 | 847 |
| 208 | 1280 | 3300 | 1.6 | −1.6 | −8.4 | −3 | −11.9 | 11.9 | 6840 | 2180 | 13 | 15 | 940 |
| 209 | 1280 | 3200 | 1.6 | −0.8 | −6.5 | −2.1 | −10 | 10 | 6710 | 2050 | 12 | 14 | 716 |
| 210 | 1280 | 3050 | 1.3 | −2.1 | −8.5 | −3.8 | −12.3 | 12.3 | 6960 | 2190 | 13 | 15 | 809 |
| 211 | 1300 | 3170 | 1.7 | −1.9 | −7.7 | −3.3 | −10.5 | 10.5 | 7690 | 2660 | 13 | 15 | 793 |
| 212 | 1300 | 3230 | 1.1 | −1.5 | −7.2 | −3 | −10.3 | 10.3 | 7350 | 2600 | 13 | 15 | 786 |
| 213* | 1360 | 2330 | 2.4 | −1.3 | −6.7 | −2.9 | −11.3 | 11.3 | 4620 | 1430 | 10 | 11 | 102 |
| 214* | 1360 | | | unmeasurable due to undersintering | | | | | | | | | |
| 215* | 1360 | | | unmeasurable due to undersintering | | | | | | | | | |
| 216* | 1360 | 2410 | 3.1 | −1.4 | −7.2 | −3 | −11.6 | 11.6 | 4900 | 1560 | 10 | 11 | 256 |

TABLE 5-continued

| Sample No. | Calcining Temp (°C.) | Dielectric Constant ε | Dielectric Loss (tan δ) (%) | Percentage Change in Capacitance with Temp. (%) | | | | | CR Product (Ω · F) | | Dielectric Breakdown Voltage (kV/mm) | | Average Duration of Life (hr) |
|---|---|---|---|---|---|---|---|---|---|---|---|---|---|
| | | | | ΔC/C$_{20}$ | | ΔC/C$_{25}$ | | | 25° C. | 125° C. | AC | DC | |
| | | | | −25° C. | +85° C. | −55° C. | 125° C. | max | | | | | |
| 217* | 1360 | unmeasurable due to undersintering | | | | | | | | | | | |
| 218* | 1360 | unmeasurable due to undersintering | | | | | | | | | | | |
| 219* | 1360 | unmeasurable due to undersintering | | | | | | | | | | | |

Note:
Samples with an asterisk are those out of the scope of the invention.

As is apparent from Tables 4 and 5, the monolithic ceramic capacitors constituted by the dielectric ceramic layers containing $SiO_2$—$TiO_2$—$M^1$-based oxide according to the first invention exhibit a high dielectric constant of 3000 or more and a dielectric loss (tan δ) of not more than 1.7%, and their percentage change in capacitance with temperature satisfies the B characteristics standard (JIS) between −25° C. and 85° C. and the X7R characteristics standard (EIA) between −55° C. and 125° C. The insulation resistance at 25° C. and 125° C., as expressed in terms of CR product, is as high as 6000 MΩ·μF or more and 2000 MΩ·μF or more, respectively. The dielectric breakdown voltage is 12 to 13 kV/mm under AC and 14 to 15 kV/mm under DC. The average duration of life is as long as 600 hours or longer. The ceramic composition can be calcined at a relatively low temperature of 1300° C. or lower.

To the contrary, samples 213 to 219 suffer from undersintering or, if sufficiently sintered, show a reduction in dielectric constant, an increase in dielectric loss, an increase in dielectric loss with an alternating voltage of 100 V/mm applied, a reduction in CR product at 25° C. and 125° C., a reduction in dielectric breakdown voltage (under both AC and DC), and an extreme reduction in average duration of life. That is, when the composition of $SiO_2$—$TiO_2$—$M^1$-based oxide is plotted on a triangular diagram of ($SiO_2$, $TiO_2$, $M^1$) as shown in FIG. 4, the composition of the oxide used in these samples is not in the area surrounded by four straight lines connecting four points: A (85,1,14), B (35,51,14), C (30,20,50), and D (39,1,60) (unit: mol %) nor on these lines.

As is understood from the results of samples 211 and 212, addition of $Al_2O_3$ and/or $ZrO_2$ to the $SiO_2$—$TiO_2$—$M^1$-based oxide is effective to provide a monolithic ceramic capacitor having an insulation resistance (CR product) of not lower than 7000 MΩ·μF at 25° C. and not lower than 2500 MΩ·μF at 125° C. Note that addition of more than about 15 parts by weight of $Al_2O_3$ or more than about 5 parts by weight, per 100 parts by weight of the $SiO_2$—$TiO_2$—$M^1$-based oxide results in extreme deterioration in sintering properties as is observed with samples 217 and 218.

EXAMPLE 3

Oxides, carbonates or hydroxides of lithium, silicon, titanium and aluminum were weighed and mixed so as to give a (molar ratio) composition of 0.25$Li_2O$−0.65 (0.30$TiO_2$·0.70$SiO_2$)−0.10$Al_2O_3$. The mixture was ground and evaporated to dryness. The resulting powder was melted by heating to 1300° C. in an aluminum crucible, quenched, and ground to obtain a powdered oxide mixture having an average particle size of not greater than 1 μm.

A ceramic composition shown in Table 6 below was compounded from (i) the barium titanate of Table 1, (ii) the powdered oxide mixture prepared above, (iii) $BaCO_3$ serving for adjustment of the Ba/Ti molar ratio of barium titanate, and (iv) at least one of $Eu_2O_3$, $Gd_2O_3$, $Tb_2O_3$, $Dy_2O_3$, $Ho_2O_3$, $Er_2O_3$, $Tm_2O_3$, and $Yb_2O_3$ and MnO, each having a purity of not lower than 99%.

TABLE 6

| Sample No. | Kind of BaTiO$_3$ | Main Component {BaO}$_m$·TiO$_2$ + αRe$_2$O$_3$ + βMnO | | | | | | | | | | | | Secondary Oxide component (part**) |
|---|---|---|---|---|---|---|---|---|---|---|---|---|---|---|
| | | α | | | | | | | | | | | | |
| | | Eu$_2$O$_3$ | Gd$_2$O$_3$ | Tb$_2$O$_3$ | Dy$_2$O$_3$ | Ho$_2$O$_3$ | Er$_2$O$_3$ | Tm$_2$O$_3$ | Yb$_2$O$_3$ | Total | β | β/α | m | |
| 301* | A | — | — | — | — | — | — | — | — | 0.0000 | 0.0100 | | 1.030 | 0.80 |
| 302* | A | — | — | 0.0100 | — | — | 0.0040 | — | — | 0.0140 | 0.0000 | 0 | 1.010 | 0.80 |
| 303* | A | — | — | — | 0.0100 | — | — | — | 0.0040 | 0.0140 | 0.0100 | 5/7 | 0.990 | 0.80 |
| 304* | A | — | 0.0100 | — | — | — | — | 0.0040 | — | 0.0140 | 0.0100 | 5/7 | 1.000 | 0.80 |
| 305* | A | 0.0100 | — | — | 0.0040 | — | — | — | — | 0.0140 | 0.0100 | 5/7 | 1.022 | 0.00 |
| 306 | A | — | 0.0005 | — | — | — | — | — | — | 0.0005 | 0.0020 | 4 | 1.005 | 0.50 |
| 307 | A | 0.0100 | — | — | — | 0.0100 | — | — | — | 0.0200 | 0.0200 | 1 | 1.010 | 0.20 |
| 308 | A | — | — | 0.0010 | 0.0030 | — | — | — | — | 0.0040 | 0.0040 | 1 | 1.035 | 0.80 |
| 309 | A | — | 0.0020 | — | — | — | 0.0020 | — | — | 0.0040 | 0.0080 | 2 | 1.010 | 0.80 |
| 310 | A | — | — | — | 0.0010 | — | 0.0010 | 0.0020 | — | 0.0040 | 0.0080 | 2 | 1.030 | 0.80 |
| 311 | A | 0.00700 | — | — | 0.0200 | — | — | — | — | 0.0270 | 0.0540 | 2 | 1.025 | 1.50 |
| 312 | C | — | 0.0050 | — | — | — | — | 0.0050 | — | 0.0100 | 0.0050 | ½ | 1.005 | 1.50 |
| 313 | B | — | — | — | 0.0050 | 0.0050 | — | — | — | 0.0100 | 0.0100 | 1 | 1.010 | 3.00 |
| 314 | A | — | — | 0.0010 | — | — | — | — | 0.0010 | 0.0020 | 0.0100 | 5 | 1.010 | 2.50 |
| 315 | A | — | 0.0030 | — | 0.0050 | — | — | — | — | 0.0080 | 0.0040 | ½ | 1.015 | 2.50 |

TABLE 6-continued

| | | Main Component {BaO}$_m$·TiO$_2$ + αRe$_2$O$_3$ + βMnO | | | | | | | | | | | | Secondary Oxide |
|---|---|---|---|---|---|---|---|---|---|---|---|---|---|---|
| Sample | Kind of | | | | α | | | | | | | | | component |
| No. | BaTiO$_3$ | Eu$_2$O$_3$ | Gd$_2$O$_3$ | Tb$_2$O$_3$ | Dy$_2$O$_3$ | Ho$_2$O$_3$ | Er$_2$O$_3$ | Tm$_2$O$_3$ | Yb$_2$O$_3$ | Total | β | β/α | m | (part**) |
| 316 | A | 0.0005 | 0.0005 | — | — | — | — | — | — | 0.0010 | 0.0010 | 1 | 1.015 | 1.50 |
| 317 | A | — | — | — | 0.0200 | 0.0030 | — | — | — | 0.0230 | 0.0230 | 1 | 1.010 | 0.80 |
| 318* | A | — | 0.0100 | 0.0200 | — | — | — | — | — | 0.0300 | 0.0300 | 1 | 1.010 | 0.80 |
| 319* | A | — | — | — | 0.0100 | — | 0.0100 | — | — | 0.0200 | 0.0800 | 4 | 1.010 | 0.80 |
| 320* | A | — | — | 0.0007 | — | — | — | — | — | 0.0007 | 0.0077 | 11 | 1.020 | 0.80 |
| 321* | A | 0.0030 | — | — | — | — | — | 0.0050 | — | 0.0080 | 0.0160 | 2 | 1.050 | 0.80 |
| 322* | A | — | 0.0050 | — | — | 0.0050 | — | — | — | 0.0100 | 0.0200 | 2 | 1.020 | 5.00 |
| 323* | D | — | — | — | 0.0010 | — | — | — | — | 0.0010 | 0.0020 | 2 | 1.020 | 1.50 |

Note:
*Samples with an asterisk are those out of the scope of the invention.
**Per 100 parts by weight of the main component.

A monolithic ceramic capacitor was produced in the same manner as in Example 1, except for using the resulting ceramic composition. The calcining temperature adopted is shown in Table 7 below. The shape and size of the monolithic ceramic capacitor were the same as those in Example 1.

The electric characteristics of the resulting condenser were measured in the same manner as in Example 1. The results obtained are shown in Table 7.

with temperature satisfies the B characteristics standard (JIS) between −25° C. and 85° C. and the X7R characteristics standard (EIA) between −55° C. and 125° C. The insulation resistance at 25° C. and 125° C., as expressed in terms of CR product, is as high as 6000 MΩ·μF or more and 2000 MΩ·μF or more, respectively. The dielectric breakdown voltage is 12 to 13 kV/mm under AC and 14 to 15 kV/mm under DC. The average duration of life is as long as 600 hours or longer. The ceramic composition can be calcined at a relatively low temperature of 1300° C. or lower.

TABLE 7

| Sample No. | Calcining Temp (°C.) | Dielectric Constant ε | Dielectric Loss (tan δ) (%) | Percentage Change in Capacitance with Temp. (%) | | | | | CR Product (Ω·F) | | Dielectric Breakdown Voltage (kV/mm) | | Average Duration of Life (hr) |
|---|---|---|---|---|---|---|---|---|---|---|---|---|---|
| | | | | ΔC/C$_{20}$ | | ΔC/C$_{25}$ | | | | | | | |
| | | | | −25° C. | +85° C. | −55° C. | 125° C. | max | 25° C. | 125° C. | AC | DC | |
| 301* | 1300 | 2800 | 1.4 | −1.5 | −5.8 | −2.4 | −13.2 | 13 | 4520 | 1710 | 11 | 14 | 15 |
| 302* | 1280 | unmeasurable due to transformation into a semiconductor | | | | | | | | | | | |
| 303* | 1280 | unmeasurable due to transformation into a semiconductor | | | | | | | | | | | |
| 304* | 1280 | 3090 | 1.2 | −0.7 | −8.1 | −1.9 | −12.3 | 11.4 | 4030 | 840 | 10 | 10 | 134 |
| 305* | 1360 | unmeasurable due to undersintering | | | | | | | | | | | |
| 306 | 1300 | 3240 | 1.3 | −1.6 | −6.7 | −3.4 | −10.2 | 10.3 | 7030 | 2110 | 13 | 14 | 856 |
| 307 | 1280 | 3150 | 1.4 | −0.2 | −7.2 | −1.6 | −11.6 | 11.3 | 7120 | 2170 | 12 | 14 | 630 |
| 308 | 1300 | 3200 | 1.6 | −2.6 | −8.6 | −4.2 | −11.9 | 11.9 | 6310 | 2020 | 12 | 14 | 750 |
| 309 | 1280 | 3080 | 1.4 | −4.3 | −6.4 | −5.3 | −10.2 | 10.6 | 7050 | 2110 | 13 | 14 | 860 |
| 310 | 1280 | 3060 | 1.1 | −3.1 | −6.3 | −4.1 | −10.9 | 12.1 | 6940 | 2070 | 13 | 15 | 880 |
| 311 | 1280 | 3240 | 1.3 | −3.2 | −7.8 | −5.8 | −11.9 | 13.1 | 7070 | 2190 | 12 | 14 | 703 |
| 312 | 1300 | 3020 | 1.4 | −0.5 | −7.5 | −1.6 | −11.1 | 13.2 | 6980 | 2150 | 13 | 15 | 721 |
| 313 | 1260 | 3160 | 1.1 | −3.8 | −6.8 | −6.3 | −10.1 | 10.4 | 6070 | 2050 | 12 | 15 | 750 |
| 314 | 1280 | 3050 | 1.3 | −0.2 | −6.5 | −0.7 | −12.6 | 12.4 | 6730 | 2070 | 13 | 14 | 892 |
| 315 | 1280 | 3280 | 1.4 | −2.5 | −8.3 | −4.3 | −10.5 | 11.1 | 7010 | 2150 | 13 | 15 | 794 |
| 316 | 1300 | 3100 | 1.5 | −1.1 | −9.4 | −2.1 | −12.8 | 11.8 | 6890 | 2140 | 12 | 15 | 843 |
| 317 | 1300 | 3060 | 1.4 | −4.1 | −8.6 | −4.3 | −10.7 | 10.5 | 6840 | 2130 | 13 | 15 | 771 |
| 318* | 1360 | 2230 | 1.3 | −0.3 | −7.3 | −0.9 | −12.3 | 10.9 | 3420 | 800 | 9 | 11 | 102 |
| 319* | 1280 | 3160 | 1.8 | −1.5 | −9.1 | −4.1 | −13.1 | 11.3 | 4500 | 1100 | 10 | 12 | 134 |
| 320* | 1280 | 3080 | 1.3 | −3.6 | −6.5 | −5.2 | −13.2 | 12.6 | 4310 | 900 | 10 | 12 | 105 |
| 321* | 1360 | unmeasurable due to undersintering | | | | | | | | | | | |
| 322* | 1200 | 2040 | 2.1 | −4.2 | −9.1 | −5.3 | −12.5 | 11.5 | 5300 | 1700 | 8 | 11 | 285 |
| 323* | 1280 | 2560 | 1.4 | −1.3 | −8.3 | −4.5 | −13.5 | 13.5 | 6100 | 2500 | 12 | 14 | 435 |

Note:
Samples with an asterisk are those out of the scope of the invention.

As is apparent from Tables 1, 6 and 7, the monolithic ceramic capacitors constituted by the dielectric ceramic layers containing Li$_2$O—(Si,Ti)O$_2$—M$^2$-based oxide according to the second invention exhibit a high dielectric constant of 3000 or more and a dielectric loss (tan δ) of not more than 1.7%, and the percentage change in capacitance To the contrary, sample 330, in which α representing the amount of Re$_2$O$_3$ is less than 0.0005, has a dielectric constant ∈ of lower than 3000, small CR products at 25° C. and 125° C., and a short average duration of life. Sample 318, in which α exceeds 0.027, requires an increased calcining temperature and has a dielectric constant lower than 3000, small CR products, a small dielectric breakdown voltage under AC or DC, and a short average duration of life.

Sample 302, in which β representing the amount of MnO is less than 0.001, undergoes reduction upon calcination in a reducing atmosphere and changes into a semiconductor having a reduced insulation resistance. Sample 319, in which β exceeds 0.054, on the other hand, shows reductions in CR product at 25° C. and 125° C., dielectric breakdown voltage, and average duration of life.

Sample 320, in which β/α representing the ratio of manganese oxide to rare earth element oxides exceeds 5, shows reductions in CR products at 25° C. and 125° C., dielectric breakdown voltage, and average duration of life.

In samples 303 and 304, in which m representing the molar ratio of barium titanate is 1.000 or less, the dielectric ceramic is transformed into a semiconductor having reduced insulation resistance when calcined in a reducing atmosphere (sample 303) or the dielectric breakdown voltage is low under both AC and DC, the CR product is small, and the average duration of life is short (sample 304). If the molar ratio m exceeds 1.035, as in sample 321, the sintering properties are extremely poor.

The amount of the $Li_2O$—$(Si,Ti)O_2$—$M^2$-based oxide should be in a range of from about 0.2 to 3.0 parts by weight, preferably about 0.8–2.5 parts, per 100 parts by weight of the main component. If it is less than 0.2 part as in sample 305, the ceramic composition suffers from undersintering. If it exceeds 3.0 parts as in sample 322, the dielectric constant cannot exceed 3000, the dielectric loss exceeds 2.0%, the CR products at 25° C. and 125° C. do not exceed 6000 $M\Omega \cdot \mu F$ and 2000 $M\Omega \cdot \mu F$, respectively, the dielectric breakdown voltage does not exceed 12 kV/mm under AC or 14 kV/mm under DC, and the duration of life is short.

The content of alkali metal oxide impurities in barium titanate should be about 0.02% by weight or less. If it exceeds 0.02% as in sample 323, reduction in dielectric constant results.

EXAMPLE 4

An $Li_2O$—$(Si,Ti)O_2$—$M^2$-based oxide component having a composition shown in Table 8 below and an average particle size of not greater than 1 μm was prepared by heating a raw material mixture at 1200° to 1500° C. The resulting oxide component was added to a main component represented by compositional formula (molar ratio):

$Ba_{1.035}O \cdot TiO_2 + 0.0010Tb_2O_3 + 0.0030Dy_2O_3 + 0.0040MnO$ in which barium titanate A shown in Table 1 was used to prepare a ceramic composition.

TABLE 8

| Sample No. | Amount of Oxide Added (wt %) | Components of $Li_2O$—$(Si,Ti)O_2$—$M^2$-based Oxide | | | | |
|---|---|---|---|---|---|---|
| | | $Li_2O$ | $(Si_wTi_{1-w})$ | w | $Al_2O_3$ | $ZrO_2$ |
| 401 | 1.00 | 20 | 80 | 0.3 | 0 | 0 |
| 402 | 1.00 | 10 | 80 | 0.6 | 5 | 5 |
| 403 | 0.80 | 10 | 70 | 0.5 | 20 | 0 |
| 404 | 0.80 | 35 | 45 | 1.0 | 10 | 10 |
| 405 | 1.50 | 45 | 45 | 0.5 | 10 | 0 |
| 406 | 1.50 | 45 | 55 | 0.3 | 0 | 0 |
| 407 | 1.00 | 20 | 70 | 0.6 | 5 | 5 |
| 408 | 1.00 | 20 | 70 | 0.4 | 10 | 0 |
| 409 | 1.20 | 30 | 60 | 0.7 | 5 | 5 |
| 410 | 1.20 | 30 | 60 | 0.8 | 10 | 0 |
| 411 | 2.00 | 40 | 50 | 0.6 | 5 | 5 |
| 412 | 2.00 | 40 | 50 | 0.9 | 0 | 10 |
| 413* | 1.50 | 10 | 85 | 0.4 | 5 | 0 |
| 414* | 2.00 | 5 | 75 | 0.6 | 10 | 10 |
| 415* | 1.20 | 20 | 55 | 0.5 | 25 | 0 |
| 416* | 1.00 | 45 | 40 | 0.8 | 0 | 15 |
| 417* | 0.80 | 50 | 45 | 0.7 | 5 | 0 |
| 418 | 1.20 | 25 | 75 | 0.9 | 0 | 0 |
| 419* | 1.50 | 25 | 75 | 1.0 | 0 | 0 |
| 420 | 1.00 | 35 | 65 | 0.9 | 0 | 0 |
| 421* | 1.50 | 35 | 65 | 1.0 | 0 | 0 |
| 422* | 1.20 | 20 | 70 | 0.2 | 0 | 10 |

Note:
Samples with an asterisk are those out of the scope of the invention.

A monolithic ceramic capacitor was produced in the same manner as in Example 1, except for using the above prepared ceramic composition. The calcining temperature adopted is shown in Table 9 below. The shape and size of the monolithic ceramic capacitor were the same as those in Example 1. The electrical characteristics of the resulting condenser were evaluated in the same manner as in Example 1. The results obtained are shown in Table 9.

TABLE 9

| Sample No. | Calcining Temp (°C.) | Dielectric Constant ε | Dielectric Loss (tan δ) (%) | Percentage Change in Capacitance with Temp. (%) | | | | | CR Product ($\Omega \cdot F$) | | Dielectric Breakdown Voltage (kV/mm) | | Average Duration of Life (hr) |
|---|---|---|---|---|---|---|---|---|---|---|---|---|---|
| | | | | $\Delta C/C_{20}$ | | $\Delta C/C_{25}$ | | | | | | | |
| | | | | −25° C. | +85° C. | −55° C. | 125° C. | max | 25° C. | 125° C. | AC | DC | |
| 401 | 1300 | 3250 | 1.5 | −0.6 | −7.1 | −1.2 | −9.1 | 9.5 | 6910 | 2130 | 12 | 14 | 713 |
| 402 | 1300 | 3120 | 1.3 | −2.1 | −6.9 | −1.9 | −9.3 | 9.8 | 7050 | 2230 | 12 | 14 | 899 |
| 403 | 1300 | 3110 | 1.2 | −1.9 | −8.1 | −1.7 | −10.5 | 10.3 | 7020 | 2030 | 13 | 15 | 846 |
| 404 | 1300 | 3200 | 1.3 | −2.9 | −8.3 | −3.2 | −12.1 | 11.9 | 6720 | 2110 | 13 | 14 | 803 |
| 405 | 1280 | 3180 | 1.2 | −1.1 | −7.2 | −1.3 | −10.1 | 11.1 | 6810 | 2210 | 13 | 15 | 740 |
| 406 | 1280 | 3260 | 1.2 | −1.6 | −8.4 | −1.8 | −11.5 | 12.3 | 6840 | 2040 | 12 | 15 | 700 |
| 407 | 1300 | 3110 | 1.3 | −1.8 | −8.1 | −4.2 | −10.9 | 11.6 | 6730 | 2200 | 12 | 15 | 856 |
| 408 | 1280 | 3290 | 1.9 | −1.7 | −8.1 | −3.1 | −11.1 | 11.7 | 7030 | 2190 | 13 | 14 | 912 |
| 409 | 1280 | 3310 | 1.5 | −0.9 | −7.2 | −2.5 | −10.1 | 10.1 | 7110 | 2090 | 13 | 14 | 760 |
| 410 | 1280 | 3090 | 1.3 | −2.3 | −8.3 | −3.9 | −11.9 | 11.8 | 7060 | 2260 | 12 | 15 | 831 |

TABLE 9-continued

| Sample No. | Calcining Temp. (°C.) | Dielectric Constant ε | Dielectric Loss (tan δ) (%) | Percentage Change in Capacitance with Temp. (%) | | | | | CR Product (Ω · F) | | Dielectric Breakdown Voltage (kV/mm) | | Average Duration of Life (hr) |
|---|---|---|---|---|---|---|---|---|---|---|---|---|---|
| | | | | $\Delta C/C_{20}$ | | $\Delta C/C_{25}$ | | | | | | | |
| | | | | -25° C. | +85° C. | -55° C. | 125° C. | max | 25° C. | 125° C. | AC | DC | |
| 411 | 1300 | 3150 | 1.6 | -1.9 | -8.1 | -3.1 | -10.3 | 11.6 | 7730 | 2530 | 13 | 14 | 811 |
| 412 | 1300 | 3200 | 1.3 | -1.6 | -7.5 | -2.7 | -10.5 | 12 | 7640 | 2460 | 13 | 15 | 794 |
| 413* | 1360 | | | unmeasurable due to undersintering | | | | | | | | | |
| 414* | 1360 | | | unmeasurable due to undersintering | | | | | | | | | |
| 415* | 1360 | 2530 | 3.3 | -0.9 | -8.2 | -1.6 | -13.2 | 11.1 | 5020 | 1340 | 9 | 11 | 193 |
| 416* | 1360 | | | unmeasurable due to undersintering | | | | | | | | | |
| 417* | 1360 | | | unmeasurable due to undersintering | | | | | | | | | |
| 418 | 1300 | 3110 | 1.4 | -2.1 | -8.1 | -4.2 | -11.7 | 11.8 | 6480 | 2010 | 12 | 14 | 673 |
| 419* | 1360 | | | unmeasurable due to undersintering | | | | | | | | | |
| 420 | 1300 | 3160 | 1.1 | -1.5 | -7.3 | -4.2 | -10.6 | 11.9 | 6830 | 2160 | 12 | 14 | 650 |
| 421* | 1360 | | | unmeasurable due to undersintering | | | | | | | | | |
| 422* | 1360 | | | unmeasurable due to undersintering | | | | | | | | | |

Note:
Samples with an asterisk are those out of the scope of the invention.

As is apparent from Tables 8 and 9, the monolithic ceramic capacitors constituted by the dielectric ceramic layers containing $Li_2O$—$(Si,Ti)O_2$—$M^2$-based oxide according to the second invention exhibit a high dielectric constant of 3000 or more and a dielectric loss (tan δ) of not more than 1.7%, and the percentage change in capacitance with temperature satisfies the B characteristics standard (JIS) between -25° C. and 85° C. and the X7R characteristics standard (EIA) between -55° C. and 125° C. The insulation resistance at 25° C. and 125° C., as expressed in terms of CR product, is as high as 6000 Ω·F or more and 2000 Ω·F or more, respectively. The dielectric breakdown voltage is 12 to 13 kV/mm under AC and 14 to 15 kV/mm under DC. The average duration of life is as long as 600 hours or longer. The ceramic composition can be calcined at a relatively low temperature of 1300° C. or lower.

To the contrary, samples 413 to 417 suffer from undersintering or, if sufficiently sintered, show a reduction in dielectric constant, an increase in dielectric loss, an increase in dielectric loss with an alternating voltage of 100 V/mm applied, a reduction in CR product at 25° C. and 125° C., a reduction in dielectric breakdown voltage (under both AC and DC), and an extreme reduction in average duration of life. That is, when the composition of $LiO_2$—$(Si,Ti)O_2$—$M^2$-based oxide is plotted on a triangular diagram of ($SiO_2$, $TiO_2$, $M^2$), the composition of the oxide used in these samples is not in the area surrounded by six straight lines connecting six points: A (20, 80, 0), B (10, 80, 10), C (10, 70, 20), D (25, 45, 20), E (45, 45, 10), and F (45, 55, 0) (unit: mol %) nor on these lines.

It should be noted, however, that when the composition is on the line A–F, if w=1.0 as in samples 419 and 421, the calcination properties are extremely deteriorated. Calcination properties are also extremely reduced if w is less than 0.30 as in sample 422.

While the barium titanate powder used in the foregoing Examples 1 to 4 is one prepared by an oxalic acid process, barium titanate powder prepared by an alkoxide process or a hydrothermal process can be used as well. In some cases, use of barium titanate powder prepared by an alkoxide process or a hydrothermal process can bring about better characteristics than demonstrated in Examples.

Further, while oxide powders, such as europium oxide, gadolinium oxide, terbium oxide, dysprosium oxide, holmium oxide, erbium oxide, thulium oxide, ytterbium oxide and magnesium oxide, were used as raw materials, the raw materials for the dielectric ceramic layers are not limited to these oxides. For example, a solution of an alkoxide or an organometallic compound of each metal element can be used as well as long as the resulting ceramic layer has composition according to the present invention.

While the invention has been described in detail and with reference to specific examples thereof, it will be apparent to one skilled in the art that various changes and modifications can be made therein without departing from the spirit and scope thereof.

What is claimed is:

1. A dielectric ceramic composition containing (a) barium titanate, (b) at least one member selected from the group consisting of europium oxide, gadolinium oxide, terbium oxide, dysprosium oxide, holmium oxide, erbium oxide, thulium oxide and ytterbium oxide and is a material comprising:

(1) 100 parts by weight of a main component represented by compositional formula:

$\{BaO\}_m \cdot TiO_2 + \alpha Re_2O_3 + \beta MnO$ wherein $Re_2O_3$ represents at least one member selected from the group consisting of $Eu_2O_3$, $Gd_2O_3$, $Tb_2O_3$, $Dy_2O_3$, $Ho_2O_3$, $Er_2O_3$, $Tm_2O_3$ and $Yb_2O_3$; $0.0005 \leq \alpha \leq 0.027$; $0.001 \leq \beta \leq 0.054$; $\beta/\alpha \leq 5$; and $1.000 < m \leq 1.035$, and (2) about 0.2 to 3.0 parts by weight of an oxide component selected from the group consisting of $SiO_2$—$TiO_2$—$M^1$ and $Li_2O$—$(Si,Ti)O_2$—$M^2$, wherein $M^1$ represents at least one member selected from the group consisting of BaO, CaO, SrO, MgO, ZnO and MnO, and $M^2$ is at least one member of the group consisting of $Al_2O_3$ and $ZrO_2$.

2. A dielectric ceramic composition according to claim 1, wherein said barium titanate contains not more than about 0.02% by weight alkali metal oxide impurity.

3. A dielectric ceramic composition according to claim 2, wherein the amount of the oxide component is about 0.8–2.5 parts by weight.

4. A dielectric ceramic composition according to claim 3, wherein $0.001 \leq \alpha \leq$; $0.002 \leq \beta \leq 0.02$; $\beta/\alpha \leq 4$; and $1.005 < m \leq 1.03$.

5. A dielectric ceramic composition according to claim 4, wherein said oxide component is $SiO_2$—$TiO_2$—$M^1$ and, when plotted on a triangular mol % diagram of ($SiO_2$, $TiO_2$, $M^1$), in the area surrounded by, or on, four straight lines connecting four points: A (85,1,14), B (35,51,14), C. (30, 20,50), and D (39,1,60) and contains at least one of $Al_2O_3$ and $ZrO_2$ in a total amount of not more than about 15 parts by weight per 100 parts by weight of the ($SiO_2$, $TiO_2$, $M^1$) component, provided that the amount of $ZrO_2$ is not more than about 5 parts by weight.

6. A dielectric ceramic composition according to claim 4, wherein said oxide component is $Li_2O$—$(Si,Ti)O_2$—$M^2$ and, when plotted on a triangular diagram of $\{Li_2O, (Si_wTi_{1-w})O_2, M^2\}$ (wherein $0.30 \leq w \leq 1.0$), in the area surrounded by, or on, six straight lines connecting six points: A (20, 80, 0), B (10, 80, 10), C (10, 70, 20), D (25, 45, 20), E (45, 45, 10), and F (45, 55, 0) (unit: mol %), provided that $0.30 \leq w < 1.0$ when the composition is on the line A–F.

7. A dielectric ceramic composition according to claim 1, wherein the amount of the oxide component is about 0.8–2.5 parts by weight.

8. A dielectric ceramic composition according to claim 1, wherein $0.001 \leq \alpha \leq 0.023$; $0.002 \leq \beta \leq 0.02$; $\beta/\alpha \leq 4$; and $1.005 < m \leq 1.03$.

9. A dielectric ceramic composition according to claim 1, wherein said oxide component is $SiO_2$—$TiO_2$—$M^1$ and, when plotted on a triangular mol % diagram of ($SiO_2$, $TiO_2$, $M^1$), in the area surrounded by, or on, four straight lines connecting four points: A (85,1,14), B (35,51,14), C (30,20, 50), and D (39,1,60) and contains at least one of $Al_2O_3$ and $ZrO_2$ in a total amount of not more than about 15 parts by weight per 100 parts by weight of the ($SiO_2$, $TiO_2$, $M^1$) component, provided that the amount of $ZrO_2$ is not more than about 5 parts by weight.

10. A dielectric ceramic composition according to claim 1, wherein said oxide component is $Li_2O$—$(Si,Ti)O_2$—$M^2$ and, when plotted on a triangular diagram of $\{Li_2O, (Si_wTi_{1-w})O_2, M^2\}$ (wherein $0.30 \leq w \leq 1.0$), in the area surrounded by, or on, six straight lines connecting six points: A (20, 80, 0), B (10, 80, 10), C (10, 70, 20), D (25, 45, 20), E (45, 45, 10), and F (45, 55, 0) (unit: mol %), provided that $0.30 \leq w < 1.0$ when the composition is on the line A–F.

11. A monolithic ceramic capacitor laminate of dielectric ceramic layers having at least two internal electrodes between adjacent dielectric ceramic layers in such a manner that different ends of each internal electrode are exposed at one end of the dielectric ceramic layers and a pair of external electrodes electrically connected to the exposed internal electrodes wherein said dielectric ceramic layers comprise the dielectric ceramic composition according to claim 1.

12. A monolithic ceramic capacitor according to claim 11, wherein said internal electrodes are nickel or a nickel alloy.

13. A monolithic ceramic capacitor according to claim 12, wherein said external electrodes are a sintered layer of electrically conductive metal powder or of electrically conductive metal powder containing glass frit.

14. A monolithic ceramic capacitor according to claim 13, wherein said sintered layer has a plated layer thereon.

15. A monolithic ceramic capacitor laminate of dielectric ceramic layers having at least two internal electrodes between adjacent dielectric ceramic layers in such a manner that different ends of each internal electrode are exposed at one end of the dielectric ceramic layers and a pair of external electrodes electrically connected to the exposed internal electrodes wherein said dielectric ceramic layers comprise the dielectric ceramic composition according to claim 3.

16. A monolithic ceramic capacitor laminate of dielectric ceramic layers having at least two internal electrodes between adjacent dielectric ceramic layers in such a manner that different ends of each internal electrode are exposed at one end of the dielectric ceramic layers and a pair of external electrodes electrically connected to the exposed internal electrodes wherein said dielectric ceramic layers comprise the dielectric ceramic composition according to claim 4.

17. A monolithic ceramic capacitor laminate of dielectric ceramic layers having at least two internal electrodes between adjacent dielectric ceramic layers in such a manner that different ends of each internal electrode are exposed at one end of the dielectric ceramic layers and a pair of external electrodes electrically connected to the exposed internal electrodes wherein said dielectric ceramic layers comprise the dielectric ceramic composition according to claim 5.

18. A monolithic ceramic capacitor laminate of dielectric ceramic layers having at least two internal electrodes between adjacent dielectric ceramic layers in such a manner that different ends of each internal electrode are exposed at one end of the dielectric ceramic layers and a pair of external electrodes electrically connected to the exposed internal electrodes wherein said dielectric ceramic layers comprise the dielectric ceramic composition according to claim 6.

19. A monolithic ceramic capacitor laminate of dielectric ceramic layers having at least two internal electrodes between adjacent dielectric ceramic layers in such a manner that different ends of each internal electrode are exposed at one end of the dielectric ceramic layers and a pair of external electrodes electrically connected to the exposed internal electrodes wherein said dielectric ceramic layers comprise the dielectric ceramic composition according to claim 9.

20. A monolithic ceramic capacitor laminate of dielectric ceramic layers having at least two internal electrodes between adjacent dielectric ceramic layers in such a manner that different ends of each internal electrode are exposed at one end of the dielectric ceramic layers and a pair of external electrodes electrically connected to the exposed internal electrodes wherein said dielectric ceramic layers comprise the dielectric ceramic composition according to claim 10.

* * * * *